May 5, 1970 F. STAHLECKER 3,510,181
SPINDLE BEARING FOR A SPINNING OR TWISTING MACHINE
Filed July 25, 1968
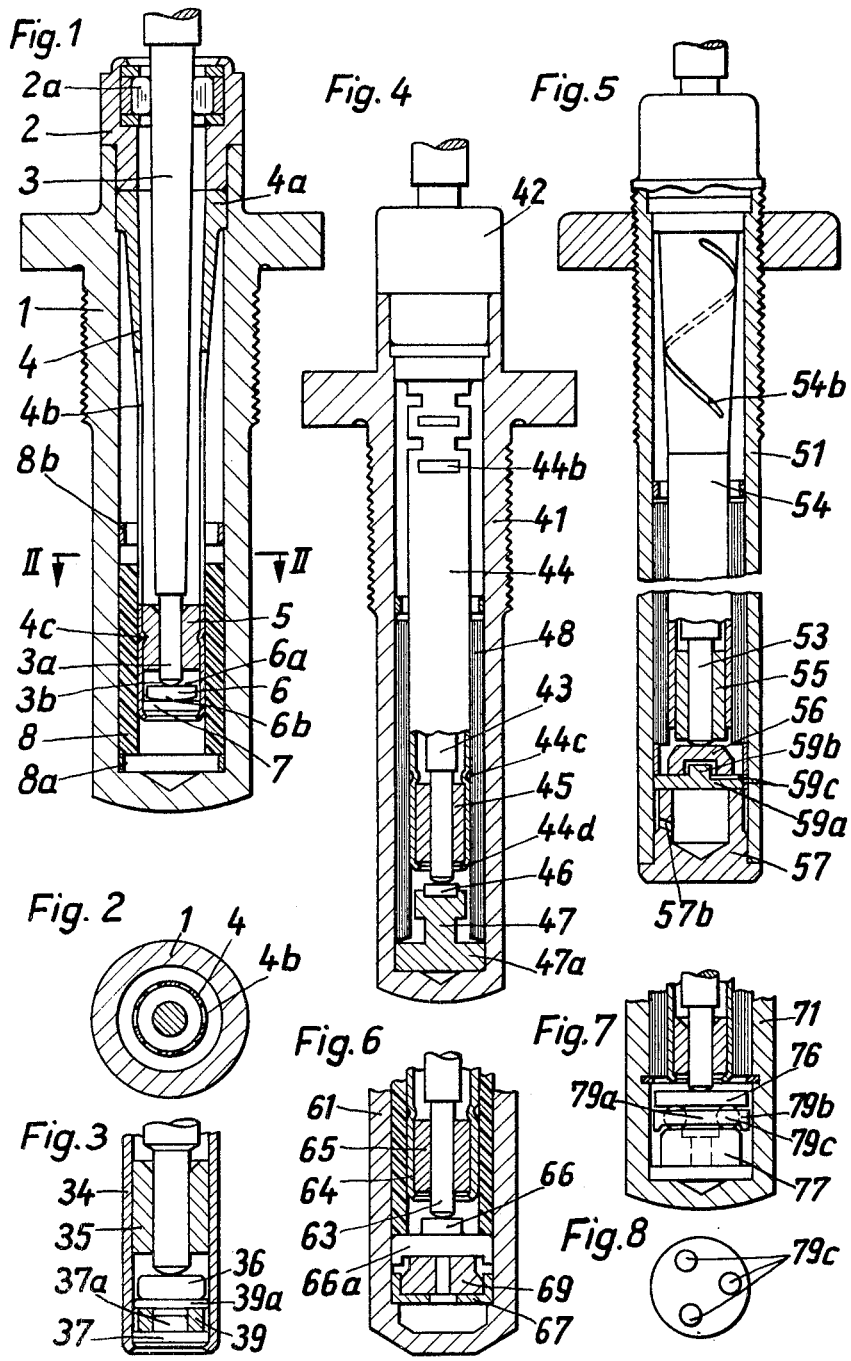
Inventor:
FRITZ STAHLECKER
BY Craig & Antonelli
ATTORNEYS

United States Patent Office 3,510,181
Patented May 5, 1970

3,510,181
SPINDLE BEARING FOR A SPINNING OR TWISTING MACHINE
Fritz Stahlecker, Bad Uberkingen, Germany, assignor to Spindelfabrik Suessen, Schurr, Stahlecker & Grill G.m.b.H., Suessen, Wurttemberg, Germany
Filed July 25, 1968, Ser. No. 747,618
Claims priority, application Germany, Aug. 16, 1967, S 111,374
Int. Cl. F16c 35/00
U.S. Cl. 308—152        9 Claims

ABSTRACT OF THE DISCLOSURE

A bearing unit for a spindle consisting of a housing, a collar bearing in the upper end of the housing, a centering tube surrounding the spindle and secured at its upper end to the housing underneath the collar bearing and having a long lower part which is radially movable, and a footstep bearing in the lower part of the housing consisting of at least two separate parts, namely, a bearing plate on which the slightly convex lower end surface of the spindle engages and which takes up the axial pressure of the spindle, and a separate bushing which is mounted in the lower part of the centering tube and is movable with the tube and adapted to take up the radial pressures of the lower end of the spindle.

---

The present invention relates to a bearing unit for a rotatable spindle of a spinning or twisting machine which consists of a housing, a collar bearing in the upper part of the housing, a centering tube surrounding the spindle shaft and connected near the collar bearing to the housing and having a lower part radially movable together with the spindle shaft, and a footstep bearing in the lower part of the housing adapted to take up the axial and radial pressures of the spindle shaft.

There are various bearing units of this type known for the spindles of spinning or twisting machines in which the footstep bearing which is provided in the usual manner with a bore with a conical bottom is mounted in a centering tube which is radially resilient by being provided with helical apertures or apertures which extend transverse to the spindle axis. These footstep bearings have a series of disadvantages. Thus, for example, the pointed lower end of the spindle shaft will be worn off relatively soon, especially if it is a heavy or heavily loaded shaft, and it will also gradually grind into the conical bottom of the footstep bearing. Due to this wear, the spindle shaft will also be lowered and this change in the vertical position may excessively increase the unavoidable manufacturing tolerances in the height of the spindle shaft. The unavoidable tolerances in alignment and centering of the pointed end of the shaft relative to its lower part which takes up the radial pressures, and also the unavoidable tolerances in alignment between the conical bottom of the bearing and the bore in which the footstep bearing is radially guided may also cause excessive friction and wear. Since a certain deviation in alignment of the footstep bearing relative to the centering tube is also unavoidable, a footstep bearing of this type may even impair the proper operation of the spindle. This may be further aggravated by the mentioned wear.

It is an object of the present invention to provide a bearing unit for a spindle of a spinning or twisting machine which overcomes these disadvantages of the known bearing as described above and insures a proper rotation of the spindle under any operating conditions, even if the spindle is heavy or bears a heavy load.

For attaining this object, the invention provides that the footstep bearing for supporting the lower end of the spindle is divided into at least two separate parts, namely, a bearing plate which is adapted to take up the axial pressures of the spindle shaft, and a bushing which is adapted to take up the radial pressures and is movable relative to the bearing plate and mounted in the centering tube. According to one feature of the invention, the bearing plate may be supported on a disk-shaped supporting member which is mounted in the centering tube. However, especially for heavy spindles it is more advisable to support the bearing plate on a supporting member which is mounted on the inner wall of the bearing housing. This has the advantage that severe axial stresses which might lead to a permanent deformation of the centering tube will not be exerted upon the latter.

Another feature of the invention consists in providing an intermediate resilient element, preferably a buffer ring made of plastic, for supporting the bearing plate on the supporting member. This feature is especially of value for spindles of considerable weight since it will reduce the effect of axial impacts which might be exerted upon the spindle shaft, for example, when the bobbins are applied thereon. When employing such a resilient buffer ring or the like, it is advisable to provide the bearing plate or its supporting member or both with projections which limit the normal axial distance between these two elements and prevent the resilient buffer from being excessively compressed in the axial direction.

For attaining a smooth and easy rotation of the spindle shaft which also does not harm the footstep bearing, it is advisable to provide the bearing plate with a plane upper bearing surface for supporting the lower end of the spindle shaft and to provide this lower end with a slightly convex surface which preferably has a radius of 25 to 35 mm. It is furthermore of advantage to guide the bearing plate so as to have a radial play of about 0.3 to 1 mm. and to make its opposite surfaces plane and parallel to each other. This not only permits the bearing plate to be produced very easily and accurately, but it also permits this plate to slide and turn easily to a small extent which facilitates the self-aligning and centering of the spindle and its foostep bearing. The center effect and the smooth run of the spindle, especially when it is driven at a high speed, may be further improved by providing an axial antifriction bearing between the bearing plate and the supporting member. According to a preferred embodiment of the invention, this antifriction bearing consists of a cage disk which is provided in radially symmetrical positions with several, preferably three, apertures in which bearing balls are guided.

The features and advantages of the present invention will become more clearly apparent from the following detailed description thereof which is to be read with reference to the accompanying drawings, in which—

FIG. 1 shows a central longitudinal section of a spindle bearing unit according to the invention which is provided with a collar bearing in a head which is pressed into the bearing housing, and with a centering tube which is provided with longitudinal slots and in which a bushing and also a separate bearing plate are mounted which together form the footstep bearing;

FIG. 2 shows a cross section which is taken along the line II—II of FIG. 1;

FIG. 3 shows a longitudinal section of a footstep bearing similar to that as shown in FIG. 1, but provided with a buffer ring between the supporting surfaces;

FIG. 4 shows a longitudinal section of a bearing unit similar to that as shown in FIG. 1, but provided with a centering tube with transverse slots in its upper part and with a supporting member which is mounted in the lower end of the housing and carries the bearing plate;

FIG. 5 shows a longitudinal section of a bearing unit similar to that as shown in FIG. 4, but provided with a helically slotted centering tube and a supporting member which forms a plug for closing the lower end of the housing;

FIG. 6 shows a longitudinal section of a footstep bearing similar to that as shown in FIG. 4, but provided with a buffer ring between the bearing plate and its supporting member;

FIG. 7 shows a longitudinal section of a footstep bearing similar to that as shown in FIG. 6, but provided with an axial ball bearing between the bearing plate and its supporting member; while FIG. 8 shows a plan view of the axial ball bearing according to FIG. 7.

Referring first to FIGS. 1 and 2 of the drawings, the bearing unit according to the invention comprises a housing 1 into the upper end of which a head 2 is pressed which contains a collar bearing 2a for the spindle shaft 3. This shaft is surrounded by a centering tube 4 which has on its upper end a flange 4a which is likewise pressed into the housing 1 underneath the head 2. The lower part of the wall of the centering tube 4 is provided with longitudinal slots 4b which render this lower part radially resilient. The lower reduced cylindrical part 3a of the spindle shaft 3 is radially guided in a bushing 5 which is held in a fixed positon in the centering tube 4 by indentations 4c. The lower end 3b of shaft 3 which has a slightly convex curvature, preferably of a radius of 25 to 35 mm., rests on the upper surface 6a of a bearing plate 6, which, in turn, rests with its slightly convex lower surface 6b on a supporting plate 7 which is secured to the centering tube 4. Bearing plate 6 is loosely guided in the centering tube 4 with a radial play of 0.3 to 1 mm. The lower part of centering tube 4 containing the bushing 5 and bearing plate 6 is surrounded in a conventional manner by a damping element 8 which may consist of a spiral spring or a resilient bushing of plastic and engages radially with the wall of housing 1, while its position in the vertical direction is determined by spacing rings 8a and 8b.

FIG. 3 shows a modification of the footstep bearing according to the invention, in which the bushing 35 and the supporting plate 37 are secured in the centering tube 34. The supporting plate 37 has a central projection 37a and carries a buffer ring 39 of rubber or resilient plastic which is centered on the projection 37a. An intermediate supporting disk 39a rests on the buffer ring 39 and is slidable longitudinally along the wall of the centering tube 34 and carries the bearing plate 36. The upper end surface of the projections 37a is spaced from disk 39a at a distance not greater than the admissible amount of compression of the buffer ring 39 in the longitudinal direction.

FIG. 4 illustrates another modification of the invention in which the collar-bearing head 42 and the upper end of the centering tube 44 are likewise pressed into the bearing housing 41. By providing the upper part of the centering tube 44 with horizontal slots 44b, its lower part is radially resilient. For securing the bushing 45 in the centering tube 44, the latter is bent inwardly directly above the bushing at 44c and at its lower end 44d. The slightly convex end surface of the spindle shaft 43 engages upon the bearing plate 46 which rests and is centered on a supporting member 47 which forms a turned part. The damping coil 48 which is inserted between the centering tube 44 and the housing 41 engages with its outer winding upon the mounting flange 47a of the supporting member 47.

In FIG. 5, the centering tube 54, the upper part of which is pressed tightly into the housing 51, is provided with helical slots 54b so as to permit the lower part to be movable in radial directions. Bushing 55 is pressed tightly into the centering tube 54. The spindle shaft 53 presses upon the bearing plate 56 which rests on an intermediate disk 59a and is guided by the projection 59 of the latter with radial play. The intermediate disk 59a is supported on the supporting member 57 which is a turned part and also serves as a plug for closing the lower end of housing 51. For attaining a good oil circulation, disk 59a is provided with grooves 59c and the supporting member 57 with one or more bores 57b.

In FIGURE 6, the bushing 65 is secured in the centering tube 64 in the same manner as shown in FIGURE 4. The spindle shaft 63 is supported on the bearing plate 66a which is provided with an annular flange 66a which is slidable in the longitudinal direction along the wall of the housing 61. The closed bottom of housing 61 further contains a cup-shaped disk 67 which is firmly secured therein and supports a resilient buffer ring 69 which carries the annular flange 66a of bearing plate 66. The annular space between the upper end surface of disk 67 and the lower end surface of flange 66a is made of such a height that, when the bearing plate 66 is temporarily depressed by an axial load on the spindle shaft, the buffer ring 69 will not be excessively compressed.

In the bearing unit according to FIG. 7, an axial ball bearing 79a is provided beween the bearing plate 76 and the supporting member 77. This ball bearing consists of a cage disk 79b of plastic in which three bores are provided for guiding the bearing balls 79c, as also shown in FIG. 8. This cage disk 79b is guided with a small radial play in the bore of housing 71, whereas bearing plate 76 has a slightly larger radial play relative to housing 71. Instead of providing the bearing plate 76 with plane bearing surfaces on both sides, its lower surface may also be provided with an annular groove to serve as a race for the bearing balls 79c.

Although my invention has been illustrated and described with reference to the preferred embodiments thereof, I wish to have it understood that it is in no way limited to the details of such embodiments but is capable of numerous modifications within the scope of the present invention.

Having thus fully disclosed by invention, what I claim is:

1. A bearing unit for a spindle for a spinning or twisting machine having a spindle shaft adapted to be rotated, a bearing housing a collar bearing for said spindle shaft mounted in an upper part of said housing, a centering tube surrounding said spindle shaft and having an upper part mounted in said housing adjacent to said collar bearing and a lower part radially movable together with said spindle shaft, and a footstep bearing in said housing for taking up the axial and radial pressures of said spindle shaft, the improvement consisting in dividing said footstep bearing into several separate parts comprising a bearing plate having a plane upper bearing surface for taking up the axial pressure of said spindle shaft, means for supporting said bearing plate, and a bushing mounted in said centering tube and movable relative to said bearing plate for taking up the radial pressures of the lower end of said spindle shaft.

2. A bearing unit as defined in claim 1, in which said supporting means comprise a supporting disk mounted in said centering tube and carrying said bearing plate.

3. A bearing unit as defined in claim 1, in which said supporting means comprise a supporting member mounted in a fixed position in said housing and carrying said bearing plate.

4. A bearing unit as defined in claim 1, further comprising an intermediate member interposed between said bearing plate and said supporting means and resilient at least in the axial direction of said spindle.

5. A bearing unit as defined in claim 4, in which said bearing plate and said supporting means form two separate elements, at least one of said elements having projections extending in the axial direction toward the other element and normally spaced at a short distance therefrom to limit the extent of the possible axial compression of said resilient intermediate member.

6. A bearing unit as defined in claim 1, in which the lower end of said spindle shaft has a slightly convex surface so as to engage substantially at a point upon said bearing plate.

7. A bearing unit as defined in claim 1, in which the upper and lower surfaces of said bearing plate are plane and parallel to each other and said plate is slidable radially for a small distance on said supporting means.

8. A bearing unit as defined in claim 1, further comprising an axial antifriction bearing interposed between said bearing plate and said supporting means.

9. A bearing unit as defined in claim 8, in which said antifriction bearing consists of a cage disk having a plurality of round apertures in radially symmetrical positions, and a bearing ball in each of said apertures and guided by the wall thereof.

References Cited

FOREIGN PATENTS 216,387 12/1941 Switzerland.
1,092,059 11/1954 France.

MARTIN P. SCHWADRON, Primary Examiner
FRANK SUSKO, Assistant Examiner